United States Patent [19]

Kawamata

[11] Patent Number: 4,484,964
[45] Date of Patent: Nov. 27, 1984

[54] METHOD OF PROVIDING A SEAL BETWEEN CAN END PLATE AND CAN BARREL

[76] Inventor: Kiyoshi Kawamata, 2-337 Takahana Cho, Ohmiya City Saitama Prefecture, Japan

[21] Appl. No.: 513,275

[22] Filed: Jul. 13, 1983

Related U.S. Application Data

[63] Continuation-in-part of Ser. No. 335,273, Dec. 28, 1981, abandoned.

[30] Foreign Application Priority Data

Jun. 22, 1981 [JP] Japan ................................ 56-92113

[51] Int. Cl.$^3$ ............................................ B32B 31/16
[52] U.S. Cl. .................................... 156/69; 229/5.7; 493/102; 493/110; 156/221
[58] Field of Search .................... 53/478; 156/69, 221; 493/102, 108, 110; 229/5.7

[56] References Cited

U.S. PATENT DOCUMENTS 3,367,808 2/1968 Edwards ............................. 156/69
4,299,350 11/1981 Woerz ................................. 229/5.5

Primary Examiner—Robert Dawson
Attorney, Agent, or Firm—Wenderoth, Lind & Ponack

[57] ABSTRACT

A method of providing a seal between the barrel portion and the end plate of a can including the steps of providing a metallic can plate having a circumferential peripheral portion of inverted U-shaped cross section, defining an annular groove, the peripheral portion including a free outer side wall, the can end plate being coated at its inner side with a first layer of heat-fusible plastic; providing a can barrel coated at its inner surface with a second layer of heat-fusible plastic; fitting the can end plate to the upper end of the can barrel such that the upper edge portion of the can barrel is tightly fitted in the annular groove and the can end plate; curling the free outer side wall at least one turn into the groove to form a curled and expanded portion protruding into the groove so that the groove has an upper portion and a lower portion narrower than the upper portion; pressing the curled and expanded portion against the upper edge portion of the can barrel so as to cause the upper edge portion of the can barrel to be compressed and expanded in the respective lower and upper portions of the groove; and applying heat to the junction between the upper end of the can barrel and the can end plate, thereby to fuse the first and second layers of plastic to form a tight seal between the can barrel and the can end plate.

13 Claims, 3 Drawing Figures

METHOD OF PROVIDING A SEAL BETWEEN CAN END PLATE AND CAN BARREL

BACKGROUND OF THE INVENTION

1. Reference to Related Application

This is a continuation-in-part of applicant's copending U.S. Application, Ser. No. 335,273, filed Dec. 28, 1981, now abandoned.

2. Field of the Invention

The present invention relates to a method of providing a seal between the barrel and the end plate of a can.

3. Description of the Prior Art

The sealing between the barrel and the end plate of a can has been achieved generally by curling the peripheral edge of the can end plate together with the edge of the can barrel, usually with a rubber or an adhesive therebetween to attain a highly gas-tight seal.

This sealing method, however, cannot apply to the case where the can barrel and the can end opening are made from different materials, as in the case of a can having a can barrel made of a paper and a can end plate make of a plastic. In such a case, therefore, the end edge of the can barrel is fitted in an inverted U-shaped annular groove formed around the periphery of the can end plate, in such a manner that the bent end edge of the annular groove strongly presses and clamps the upper edge of the barrel wall thereby to achieve a seal. This sealing structure, relying solely on the pressing and clamping, cannot provide a perfect seal in the contact region between the can barrel and the can end plate, so that it often experiences the unfavorable result that the content of the can leaks to the outside.

SUMMARY OF THE INVENTION

Accordingly, an object of the invention is to provide an improved method of providing a seal between the can barrel and the can end plate, capable of eliminating the above-described problems of the prior art.

To this end, according to the invention, there is provided a method of providing a seal between a can barrel and a can end plate comprising the steps of: preparing a plastic coated can end plate resembling a press-to-fit type lid and lined at its inner side with a layer of heat-fusible plastic, the can end plate having an inversed U-shaped annular groove formed in the periphery thereof; fitting the can end plate to the can barrel such that the upper edge portion of the can barrel is tightly fitted in the annular groove in the can end plate; curling and stretching the free outer side wall at least one turn into the groove to form a curled and stretched portion protruding into the groove so that the groove has an upper portion and a lower portion narrower than the upper portion; pressing the curled and stretched portion against the upper edge portion of the can barrel so as to cause the upper edge portion of the can barrel to be compressed and expanded in the respective lower and upper portions of the groove; and applying heat to the junction between the upper end of the can barrel and the can end plate, thereby to fuse the plastic thereby to bond and unite the can end plate to the can barrel.

The above and other objects, features and advantages of the invention will become clear from the following description of the preferred embodiments taken in conjunction with the accompanying drawings.

DESCRIPTION OF THE PREFERRED EMBODIMENTS

Figure 1:
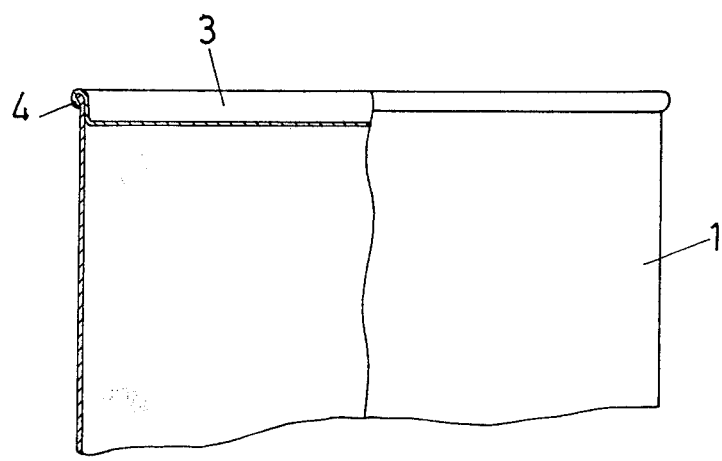
FIG. 1 is a partly cut-away schematic front elevational view of a can having a can barrel and a can end plate between which a seal is achieved in accordance with the method of the invention.
Figure 2:
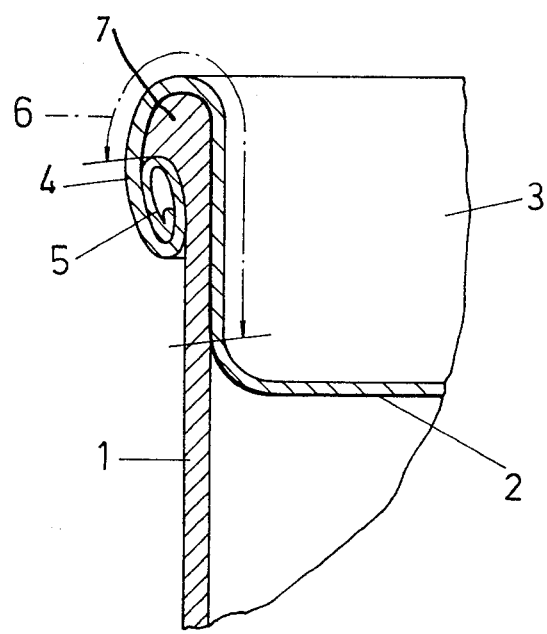
FIG. 2 is an enlarged sectional elevational view of a portion of the can as shown in FIG. 1.

Referring first to FIGS. 1 and 2, a heat-fusible resin such as polyethylene is applied to the inner surface of a can barrel 1 made of a paper. Alternatively, the can barrel 1 is lined with a film of a heat fusible plastic. A can end plate 3 resembling a push-to-fit type lid, lined at its inner side with a layer of heat fusible plastic such as polyethylene, is fitted to the upper end of the can barrel 1, in such a manner that the upper edge of the can barrel 1 fits in an annular groove formed in the peripheral portion 4 of the can end plate 3 which has an inverted U-shaped cross section. The lowest portion of the outer peripheral wall 5 of the groove portion 4 is curled and stretched inwardly of the groove at least one full turn (loop) so as to form a curled and stretched portion which protrudes into the groove at the lower end thereof inside as intermediate portion of wall 5. Then, the curled end portion 5 constituting the outer wall of the groove portion 4 is strongly pressed against the outer surface of the fitting portion of the barrel 1 so that the fitting portion is compressed and expanded so that an expanded portion 7 fills the upper portion of the groove thereby to firmly clamp the upper end edge of the can barrel by the walls of the groove portion 4.

Simultaneously with the step of the pressing and clamping or, alternatively, in a different step, the peripheral end portion of the can end plate starting from the rising portion 6 and terminating at the annular groove, i.e. the portion indicated by a chain-line arrow in FIG. 2, is pressed and the joint portion between the can barrel and the can end plate is heated thereby to fuse and bond the plastics of the can end plate and the can barrel, whereby the can end plate is firmly attached to the can barrel forming a tight seal therebetween.

The heat can be applied in various ways. For instance, the heat may be applied by means of heat sources built into the chuck for holding the can end plate and in the mandrel or core. It is also possible to apply the heat after the can barrel and the can end plate have been assembled by moving them through a heating oven provided separately. Alternatively, the heat is applied locally by means of a high-frequency heating device.

Although in the described embodiment the can barrel 1 is made of a paper, this is not the exclusive material from which it may be made and the can barrel may also be formed of a metal or a plastic.

As has been described, according to the invention, the can end plate resembling a press-to-fit type lid is attached to the upper end of the can barrel, such that the upper end edge of the barrel wall is fitted in an inversed U-shaped annular peripheral groove of the can end plate. The upper end edge of the barrel wall is strongly pressed and clamped between the walls of the annular peripheral groove of the can end plate so that the uppermost edge portion of the can expands into the portion of the groove above the curled end portion. Then, heat is applied to the joint portion between the can barrel and the can end plate so that the plastics of these members are fused and bonded together.

According to this method of the invention, therefore, it is possible to form a tight and highly reliable seal between the can barrel and the can end plate, even if the clamping by the peripheral edge of the can end plate is made insufficient by itself to provide a reliable seal.

Figure 3:
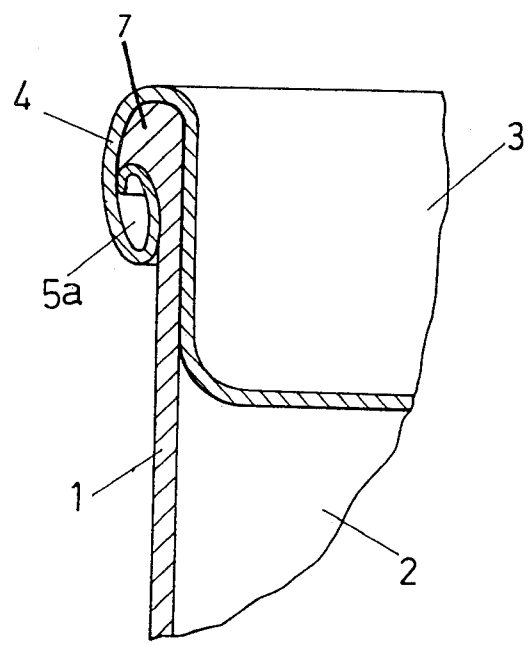
FIG. 3 is an enlarged sectional elevational view of a part of a can constructed in accordance with another embodiment of the invention.

According to the invention, since a tight seal is formed by the fusion bonding between the plastics on the can barrel and the can end plate, it is not always necessary to curl or turn the extremity of the can end plate more than two times. Namely, the extremity of the can end plate may be curled or turned only once as illustrated at 5a in FIG. 3.

It will also be clear to those skilled in the art that the invention can be applied not only to a can having a circular horizontal section as illustrated, but also to cans having square or rectangular or other polygonal cross sections.

Various other changes and modifications are possible without departing from the spirit and scope of the invention which is limited solely by the appended claims.

What is claimed is:

1. A method of providing a seal between a can barrel and a can end plate comprising the steps of:
   (1) providing a press-to-fit type lid comprising a metalic can end plate having a circumferential peripheral portion of inverted U-shaped cross section, defining an annular groove, the peripheral portion including a free outer side wall, the can end plate being coated at its inner side with a first layer of heat-fusible plastic;
   (2) providing a can barrel coated at its inside surface with a second layer of heat-fusible plastic;
   (3) fitting the can end plate to the upper end of the can barrel such that the upper edge portion of the can barrel wall is tightly fitted in the annular groove in the can end plate;
   (4) curling the free outer side wall at least one turn into the groove to form a curled portion protruding into the groove so that the groove has an upper portion and a lower portion narrower than the upper portion;
   (5) pressing the curled portion against the upper edge portion of the can barrel so as to cause the upper edge portion of the can barrel to be compressed and expanded in the respective lower and upper portions of the groove; and
   (6) applying heat to the juncture between the upper end of the can barrel and the can end plate, thereby to fuse the first layer of plastic and second layer of plastic to form a tight seal between the can barrel and the can end plate.

2. A method of providing a seal between a can barrel and a can end plate as claimed in claim 1, wherein the can barrel is made of a plastic.

3. A method of providing a seal between a can barrel and a can end plate as claimed in claim 1, wherein the can barrel is made from a paper.

4. A method of providing a seal between a can barrel and a can end plate as claimed in claim 1, wherein said step of providing a can barrel comprises the step of providing a can barrel having an upper edge portion of cylindrical shape and generally uniform thickness, and said step of fitting comprises the step of fitting the upper edge portion of cylindrical shape and generally uniform thickness in the annular groove in the can end plate.

5. A method of providing a seal between a can barrel and a can end plate as claimed in claim 4, wherein the can barrel is made of a plastic.

6. A method of providing a seal between a can barrel and a can end plate as claimed in claim 4, wherein the can barrel is made from a paper.

7. A method of providing a seal between a can barrel and a can end plate as claimed in claim 1, wherein said step of curling comprises the step of curling the lowest portion of said upper free edge below an intermediate portion of said upper free edge inward and upward in at least one full loop into the lower portion of the annular groove inside said intermediate portion.

8. A method of providing a seal between a can barrel and a can end plate as claimed in claim 7, wherein said step of providing a can barrel comprises the step of providing a can barrel having an upper edge portion of cylindrical shape and generally uniform thickness, and said step of fitting comprises the step of fitting the upper edge portion of cylindrical shape and generally uniform thickness in the annular groove in the can end plate.

9. A method of providing a seal between a can barrel and a can end plate as claimed in claim 8, wherein the can barrel is made of a plastic.

10. A method of providing a seal between a can barrel and a can end plate as claimed in claim 8, wherein the can barrel is made from a paper.

11. A method of providing a seal between a can barrel and a can end plate as claimed in claim 7, wherein the can barrel is made of a plastic.

12. A method of providing a seal between a can barrel and a can end plate as claimed in claim 7, wherein the can barrel is made from a paper.

13. A method of providing a seal between a can barrel and a can end plate as claimed in claim 1, wherein said step of curling includes the step of stretching the free outer side wall so that the curled portion is stretched.

* * * * *